US010007836B2

(12) United States Patent
Okamoto et al.

(10) Patent No.: US 10,007,836 B2
(45) Date of Patent: Jun. 26, 2018

(54) BIRD DETECTION DEVICE, BIRD DETECTION SYSTEM, BIRD DETECTION METHOD, AND PROGRAM EXTRACTING A DIFFERENCE BETWEEN THE CORRECTED IMAGES

(71) Applicant: NEC Corporation, Tokyo (JP)

(72) Inventors: Yuji Okamoto, Tokyo (JP); Hiroyuki Kumeno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 249 days.

(21) Appl. No.: 14/780,974

(22) PCT Filed: Mar. 24, 2014

(86) PCT No.: PCT/JP2014/058023
§ 371 (c)(1),
(2) Date: Sep. 28, 2015

(87) PCT Pub. No.: WO2014/157058
PCT Pub. Date: Oct. 2, 2014

(65) Prior Publication Data
US 2016/0063310 A1   Mar. 3, 2016

(30) Foreign Application Priority Data

Mar. 28, 2013 (JP) ................................. 2013-068915

(51) Int. Cl.
*G06K 9/00* (2006.01)
*G06T 7/20* (2017.01)
*H04N 5/232* (2006.01)
(52) U.S. Cl.
CPC ..... *G06K 9/00201* (2013.01); *G06K 9/00362* (2013.01); *G06K 9/00771* (2013.01);
(Continued)

(58) Field of Classification Search
CPC .................................................. G06K 9/00201
(Continued)

(56) References Cited

U.S. PATENT DOCUMENTS 5,323,391 A * 6/1994 Harrison ................. H04J 4/005
370/210
6,539,055 B1 * 3/2003 Hazra ..................... G11B 27/11
348/700

(Continued)

FOREIGN PATENT DOCUMENTS

JP       06-274625       9/1994
JP       2009-203873     9/2009

(Continued)

OTHER PUBLICATIONS

Supplementary European Search Report—EP 14 77 3645—dated Oct. 18, 2016.

(Continued)

*Primary Examiner* — Leron Beck
(74) *Attorney, Agent, or Firm* — Young & Thompson

(57) ABSTRACT

A bird detection device equipped with: a captured image acquisition unit that acquires a captured image; a bird candidate image extraction unit that extracts a bird candidate image, which is a candidate bird image, from the captured image; and a bird detection determination unit that, on the basis of the time required for the bird candidate image to move in accordance with the size of the bird candidate image in the captured image, determines whether a bird has been detected. The bird detection determination unit also can determine whether a bird has been detected on the basis of the degree of change in the shape of the bird candidate image for a prescribed time interval.

7 Claims, 8 Drawing Sheets

(52) U.S. Cl.
CPC ........... *G06T 7/20* (2013.01); *H04N 5/23229* (2013.01); *G06T 2207/10016* (2013.01); *G06T 2207/30252* (2013.01)

(58) Field of Classification Search
USPC ........................................................ 348/143
See application file for complete search history.

(56) References Cited

U.S. PATENT DOCUMENTS

| | | | | |
|---|---|---|---|---|
| 7,433,494 | B2* | 10/2008 | Niwa | B60R 25/104 348/169 |
| 8,005,266 | B2* | 8/2011 | Saka | G06K 9/00369 348/118 |
| 8,279,109 | B1* | 10/2012 | Piesinger | G01S 7/412 342/43 |
| 2001/0046310 | A1 | 11/2001 | Shima | |
| 2005/0185742 | A1* | 8/2005 | Liu | H04L 7/007 375/348 |
| 2007/0047644 | A1* | 3/2007 | Lee | H04N 19/176 375/240.1 |
| 2008/0266171 | A1* | 10/2008 | Weber | G01S 7/003 342/123 |
| 2009/0185900 | A1* | 7/2009 | Hirakata | F03D 7/0264 416/1 |
| 2009/0238407 | A1* | 9/2009 | Tasaki | G06T 7/73 382/103 |
| 2009/0269047 | A1* | 10/2009 | Sosa | G03B 15/03 396/164 |
| 2009/0309702 | A1 | 12/2009 | Hirai | |
| 2011/0054691 | A1* | 3/2011 | Lee | A01M 29/06 700/259 |
| 2011/0274317 | A1 | 11/2011 | Oami et al. | |
| 2012/0027092 | A1* | 2/2012 | Matsui | H04N 19/105 375/240.16 |
| 2012/0170818 | A1 | 7/2012 | Hirai | |
| 2012/0222611 | A1* | 9/2012 | Yifrach | A01M 29/32 116/22 A |
| 2013/0098309 | A1* | 4/2013 | Nohara | A01M 29/06 119/713 |
| 2013/0177218 | A1 | 7/2013 | Hirai | |
| 2017/0195551 | A1* | 7/2017 | Klein | H04N 5/23216 |

FOREIGN PATENT DOCUMENTS

| | | |
|---|---|---|
| JP | 2010-027035 | 2/2010 |
| JP | 2010-193768 | 9/2010 |
| JP | 2011-229453 | 11/2011 |
| WO | 2010084738 | 7/2010 |

OTHER PUBLICATIONS

Dezhen Song et al.: "A Low False Negative Filter for Detecting Rare Bird Species From Short Video Segments Using a Probable Observation Data Set-Based EKF Method", IEEE Transactions on Image Processing, IEEE Service Center, Piscataway, NJ, US, vol. 19, No. 9, Sep. 1, 2010 (Sep. 1, 2010), pp. 2321-2331. XP011328599, ISSN: 1057-7149, DOI: 10.1109/TIP.2010.2048151 abstract Section IV.A.

Dezhen Song et al: "System and algorithms for an autonomous observatory assisting the search for the Ivory-Billed Woodpecker", Automation Science and Engineering, 2008. Case 2008. IEEE International Conference on. IEEE, Piscataway, NJ, USA, Aug. 23, 2008 (Aug. 23, 2008), pp. 200-205, XP031321679, ISBN: 978-1-4244-2022-3 Section V and VII.

Xiao-Yan Zhang et al.: "Automatic Detection and Tracking of Maneuverable Birds in Videos", Computational Intelligence and Security, 2008. CIS '08. International Conference on, IEEE, Piscataway, NJ USA, Dec. 13, 2008 (Dec. 13, 2008), pp. 185-189, XP031379104, ISBN: 978-0-7695-3508-1 Sections 1 and 2.

Kidane Mihreteab et al.: "Crow birds detection using HOG and CS-LBP", Intelligent Signal Processing and Communications Systems (ISPACS), 2012 International Symposium on, IEEE, Nov. 4, 2012 (Nov. 4, 2012), pp. 406-409, XP032338452, DOI: 10.1109/ISPACS.2012.6473520 ISBN: 978-1-4673-5083-9 the whole document.

Ove Danner: "Counting Birds" In: "Counting Birds", Jul. 31, 2012 (Jul. 31, 2012), Universiteit van Amsterdam, XP055309305, Introduction.

Robert Collins: "Video Change Detection" In: "Video Change Detection", Jan. 1, 2007 (Jan. 1, 2007), Penn State, XP055309341, the whole document.

International Search Report PCT/JP2014/058023 dated May 20, 2014.

Singaporean Office Action dated Aug. 10, 2016 in the corresponding Singaporean Patent Application 11201507832T.

* cited by examiner

US 10,007,836 B2

BIRD DETECTION DEVICE, BIRD DETECTION SYSTEM, BIRD DETECTION METHOD, AND PROGRAM EXTRACTING A DIFFERENCE BETWEEN THE CORRECTED IMAGES

TECHNICAL FIELD

The present invention relates to a bird detection device, a bird detection system, a bird detection method, and a program.

BACKGROUND ART

Bird detection is needed in order to effectively take measures against collision between a bird and an airplane or the like, what is called a bird strike. For example, detecting a bird in an airport makes it possible to take countermeasures such as repelling birds with a blank shot sound and preventive measures such as identifying birds' range of activities to remove their feeding ground.

Regarding detection of birds, PTL 1 discloses a flying object detection system for detecting an object flying from the windward side of a wind generator device which includes: a tower erected on the ground, a nacelle fixed to the tower, and a plurality of blades rotatably fixed to the nacelle through a hub.

The flying object detection system includes: image capturing means which is provided behind the blades in the nacelle and limits an image capturing region to the windward side; image capturing control means which controls to allow the image capturing means to capture image at a timing when turning blades do not obstruct the image capturing region; data processing means which processes data to make the data suitable for detecting a flying object by using the captured image data obtained by the image capturing means; detection means which detects a flying object based on the data processed by the data processing means; and detection result output means which outputs a detection result provided by the detection means to the wind generator device.

PTL 1 states that the flying object detection system efficiently reduces bird strikes in a wind generator device.

PTL 2 discloses a bird threatening device which includes: an image capturing device which continuously takes captured images of a predetermined spatial region; a bird detection device which uses the optical flow method to calculate the speed of a flying object in an image based on a mode change among a plurality of pieces of image data taken by the image capturing device and determines that the flying object is a bird if the calculated speed of the flying object is equal to or greater than a predetermined speed and reasonably corresponds to a bird's speed; and a threatening device which outputs a threatening output toward a predetermined spatial region when the bird detection device detects a bird.

PTL 2 states that the bird threatening device increases the probability of avoiding bird strikes by calculating the speed of a flying object in real time, determining that the flying object is a bird, and effectively threatening birds, without using a high-performance computer.

PTL 3 describes using the particle image velocimetry or the optical flow method for a bird detection algorithm for detecting birds.

More specifically, according to PTL 3, when the particle image velocimetry is used, birds are regarded as particles and are detected on the basis of how the particles are moving in images taken by an imaging unit.

According to PTL 3, when the optical flow method is used, a bird is detected by calculating the velocity vector at the individual position coordinates in an image taken by the imaging unit and determining that the velocity vector is attributable to a bird if the velocity vector in terms of size or direction exceeds a predetermined reference value.

CITATION LIST

Patent Literature

[PTL 1] Japanese Unexamined Patent Application Publication No. 2009-203873
[PTL 2] Japanese Unexamined Patent Application Publication No. 2010-193768
[PTL 3] Japanese Unexamined Patent Application Publication No. 2011-229453

SUMMARY OF INVENTION

Technical Problem

A method involving a velocity field or optical flow as described in PTL 1 to 3 needs to detect a distance between the imaging device and the flying object in order to calculate the speed of the flying object. Accordingly, such method requires a mechanism for detecting a distance between the imaging device and the flying object, such as a device or program which calculates the distance between a stereo camera or stereo image and a subject to be captured, resulting in an increase in the cost of equipment.

Additionally, regarding the method for detecting a bird by using the particle image velocimetry, PTL 3 does not show how a bird is detected from the motion of particles in images. Thus, the method for detecting a bird by using the particle image velocimetry cannot be achieved.

Another problem is that not only birds but also airplanes are captured at an airport. When detecting a bird from the motion of particles in images, a misjudgment may occur due to the failure in distinguishing between a bird and an airplane.

An object of the present invention is to provide a bird detection device, a bird detection system, a bird detection method, and a program, all of which provide solutions to the above-described problems.

Solution to Problem

The present invention, having been designed in order to solve the above-described problems, provides a bird detection device including: a captured image acquisition unit which obtains a captured image; a bird candidate image extraction unit which extracts a bird candidate image, which is a candidate for a bird image, from the captured image; and a bird detection determination unit which determines whether a bird has been detected, based on a time required for the bird candidate image to move in accordance with a size of the bird candidate image in the captured image.

In addition, the present invention provides a bird detection system including: an image capturing device which takes a captured image; and a bird detection device, wherein the bird detection device includes: a captured image acquisition unit which obtains a captured image; a bird candidate image extraction unit which extracts a bird candidate image, which is a candidate for a bird image, from the captured image; and a bird detection determination unit which determines whether a bird has been detected, based on a time required for the bird candidate image to move in accordance with a size of the bird candidate image in the captured image.

In addition, the present invention provides a method for detecting a bird, the method being implemented by a bird detection device and including: a captured image acquisition step which obtains a captured image; a bird candidate image extraction step which extracts a bird candidate image, which is a candidate for a bird image, from the captured image; and a bird detection determination step which determines whether a bird has been detected, based on a time required for the bird candidate image to move in accordance with a size of the bird candidate image in the captured image.

In addition, the present invention provides a program for causing a computer as a bird detection device to execute: a captured image acquisition step which obtains a captured image; a bird candidate image extraction step which extracts a bird candidate image, which is a candidate for a bird image, from the captured image; and a bird detection determination step which determines whether a bird has been detected, based on a time required for the bird candidate image to move in accordance with a size of the bird candidate image in the captured image.

Advantageous Effect of Invention

According to the present invention, birds can be detected more accurately without the need for a mechanism for detecting a distance to a flying object.

DESCRIPTION OF EMBODIMENTS

Exemplary embodiments of the present invention will now be described with reference to the drawings.

Figure 1:
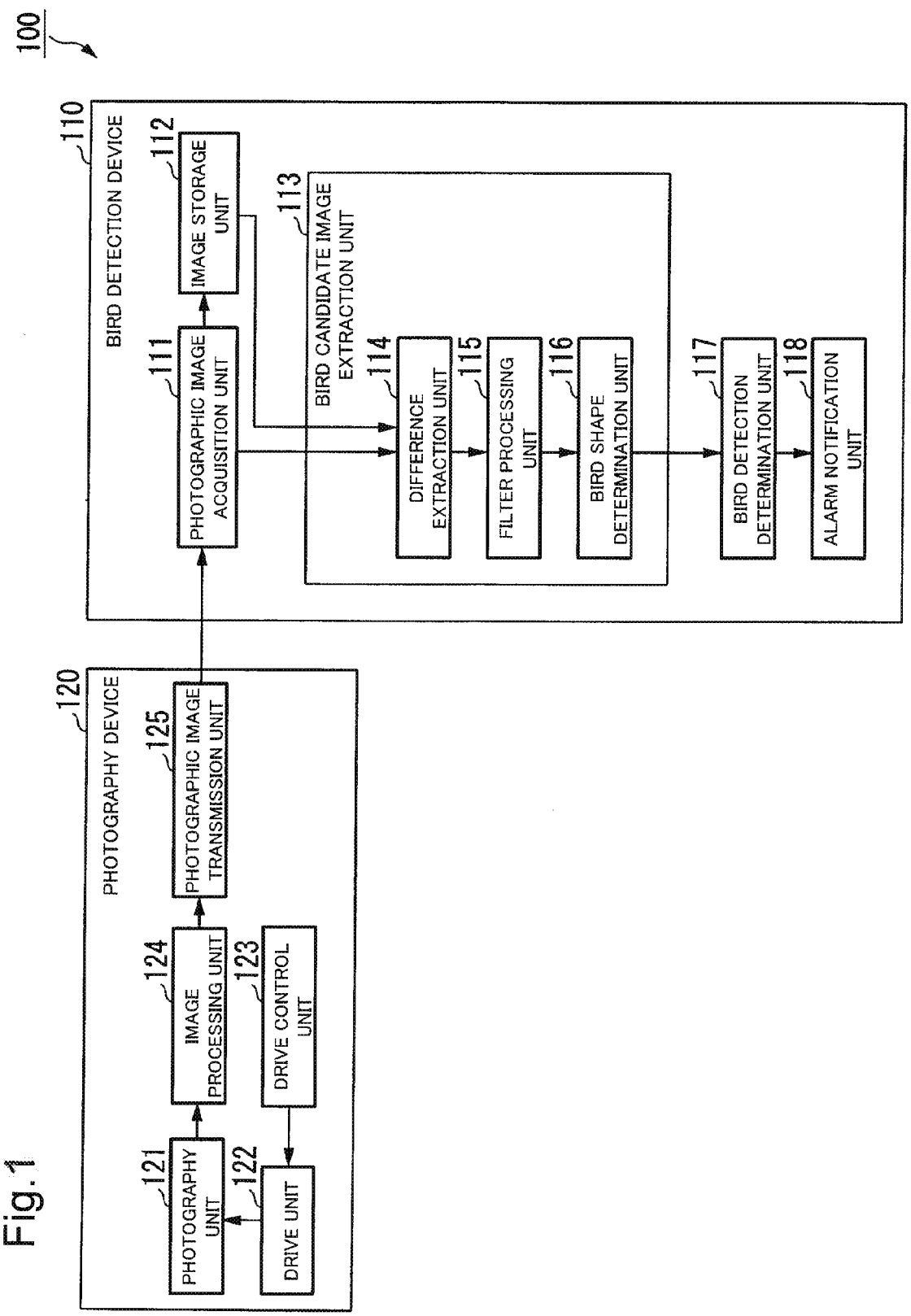
FIG. 1 is a schematic block diagram illustrating a functional configuration of a bird detection system according to one exemplary embodiment of the present invention.

FIG. 1 is a schematic block diagram illustrating a functional configuration of a bird detection system according to one exemplary embodiment of the present invention.

With reference to FIG. 1, a bird detection system 100 includes a bird detection device 110 and an image capturing device 120.

The bird detection device 110 includes a captured image acquisition unit 111, an image storage unit 112, a bird candidate image extraction unit 113, a bird detection determination unit 117, and an alarm notification unit 118. The bird candidate image extraction unit 113 includes a difference extraction unit 114, a filter processing unit 115, and a bird shape determination unit 116.

The image capturing device 120 includes an image capturing unit 121, a drive unit 122, a drive control unit 123, an image processing unit 124, and a captured image transmission unit 125.

It should be noted that the number of devices included in the bird detection system 100 is not limited to two as shown in FIG. 1. For example, one device may be comprised of the bird detection device 110 and the image capturing device 120, and the bird detection system 100 may include such one device.

Alternatively, the bird detection system 100 may include three or more devices in such a way that, for example, the image storage unit 112 is configured as a storage device external to the bird detection device 110.

The bird detection system 100 is a system which detects a bird by taking images in or around an airport.

The image capturing device 120 is installed at, for example, the end of a runway to take images in or around the airport by, for example, taking images in various directions including the direction of the runway. In particular, the image capturing device 120 detects a bird by taking images in a relatively low-altitude area, such as on the ground surface or around the sea surface.

Radars can be used to detect a bird in a relatively high-altitude area, but, in a low-altitude area, bird detection based on radars encounters lower accuracy under the influence of clutters (unwanted radio waves generated by radar radio waves reflected from sea surface, rain, or the like). For this reason, the bird detection system 100 detects a bird by detecting a bird from captured images under no influence of radar clutters.

The image capturing unit 121, which has an image pickup device, takes images by transforming incident light coming from outside the image capturing device 120 into image data. The image capturing unit 121 takes images at predetermined image capturing intervals, such as at 100 millisecond intervals.

The drive unit 122 drives the image capturing unit 121 to cause the image capturing unit 121 to swivel horizontally, to oscillate vertically, to zoom in/out, and the like. In particular, the drive unit 122 drives the image capturing unit 121 to swivel horizontally as an image capturing direction at a constant speed. Additionally, the drive unit 122 drives the image capturing unit 121 to change its image capturing direction to a vertical direction following a user operation. Furthermore, the drive unit 122 drives the image capturing unit 121 to change its zoom state following a user operation.

Figure 2:
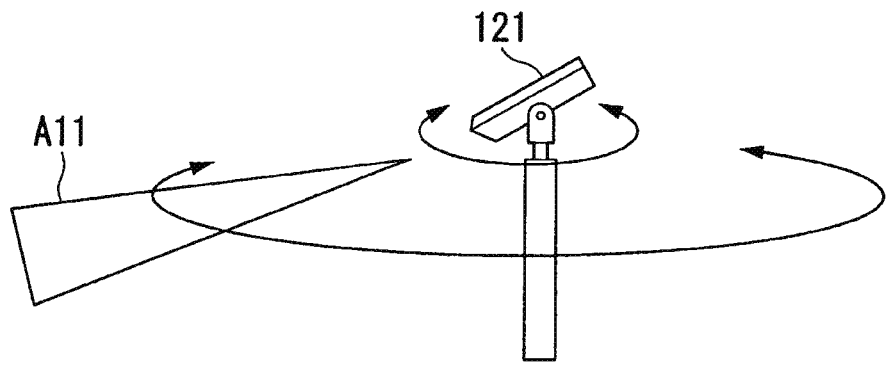
FIG. 2 is an explanatory diagram illustrating swiveling of an image capturing unit 121 according to the exemplary embodiment.

FIG. 2 is an explanatory diagram illustrating swiveling of the image capturing unit 121. FIG. 2 shows a camera as the image capturing unit 121 and an image capturing area A11 covered by the image capturing unit 121.

The drive unit 122 causes the image capturing area A11 covered by the image capturing unit 121 to revolve at a certain cycle by driving the image capturing unit 121 to swivel at a constant speed, for example, by driving the image capturing unit 121 to rotate 360 degrees at a cycle of 5 minutes. In this way, the bird detection system 100 can monitor a large area using a single camera as the image capturing unit 121.

It should be noted, however, that swiveling of the image capturing unit 121 is not essential for the present invention. For example, the image capturing unit 121 may take images in a fixed direction in such a way that a fixed camera captured images in a direction along the runway. Alternatively, the image capturing unit 121 may have a plurality of fixed cameras to monitor a large area by detecting a bird in images obtained by the individual cameras.

The drive control unit 123 controls the drive unit 122 so as to control operations of the image capturing unit 121.

The image processing unit 124 processes captured images taken by the image capturing unit 121, such as correcting an image which suffered the rolling shutter phenomenon caused by swiveling of the image capturing unit 121 (a phenomenon occurring when an object moves faster than the speed of scanning across an image taken by a camera).

The captured image transmission unit 125 sends captured images which underwent image processing made by the image processing unit 124 to the bird detection device 110 in the form of image data.

The bird detection device 110 detects a bird based on captured images taken by the image capturing device 120 (image capturing unit 121). The bird detection device 110 is comprised of a computer, for example.

The captured image acquisition unit 111 obtains captured images which were taken by the image capturing unit 121 and underwent image processing made by the image processing unit 124, by receiving the image data transmitted from the image capturing device 120.

The image storage unit 112 stores the captured images obtained by the captured image acquisition unit 111.

The image capturing unit 121 takes images at predetermined image capturing intervals, as described above, and the captured image acquisition unit 111 obtains captured images at the image capturing intervals. The image storage unit 112 stores the captured images obtained by the captured image acquisition unit 111 equivalent to a predetermined period (for example, ten sequential images starting from the current one).

The bird candidate image extraction unit 113 extracts a part representing a candidate for a bird image (hereinafter called "bird candidate image") from captured images obtained by the captured image acquisition unit 111.

The difference extraction unit 114 in the bird candidate image extraction unit 113 extracts a difference between the current captured image obtained by the captured image acquisition unit 111 and the captured image immediately before the current captured image. More specifically, the difference extraction unit 114 obtains the current captured image from the captured image acquisition unit 111, while obtaining (reading) the captured image immediately before the current captured image from the image storage unit 112.

Then, the difference extraction unit 114 detects a movement of an object in captured images by calculating the amount of shift in an image caused by swiveling of the image capturing unit 121, correcting images by the calculated amount of shift, and extracting a difference between corrected images.

Various methods may be used for the difference extraction unit 114 to calculate the amount of shift between two images P11 and P12. For example, the difference extraction unit 114 may obtain the rotating angle (amount of swiveling) of the image capturing unit 121 per image capturing interval and calculate the amount of shift based on the rotating angle.

In particular, if the image capturing unit 121 swivels at a constant speed, the difference extraction unit may store an amount of shift between images in advance. Alternatively, the difference extraction unit 114 may detect the position of a stationary object (an object not moving its position relative to the ground) like a terminal building in each of the images P11 and P12 and then calculate the amount of shift between the images P11 and P12 based on the obtained positional difference between the images.

The difference extraction unit 114 removes a shift between captured images caused under the influence of swiveling of the image capturing unit 121 by correcting horizontal positions of the images P11 and P12 relative to one another based on the obtained amount of shift. Then, the difference extraction unit 114 detects a candidate for a moving object image (hereinafter called "moving object candidate image") in captured images by extracting a difference (obtaining a differential image) between corrected images P11 and P12.

In addition, the difference extraction unit 114 removes noise by determining the product of the current differential image obtained this time and the differential image obtained last time.

Figure 3:
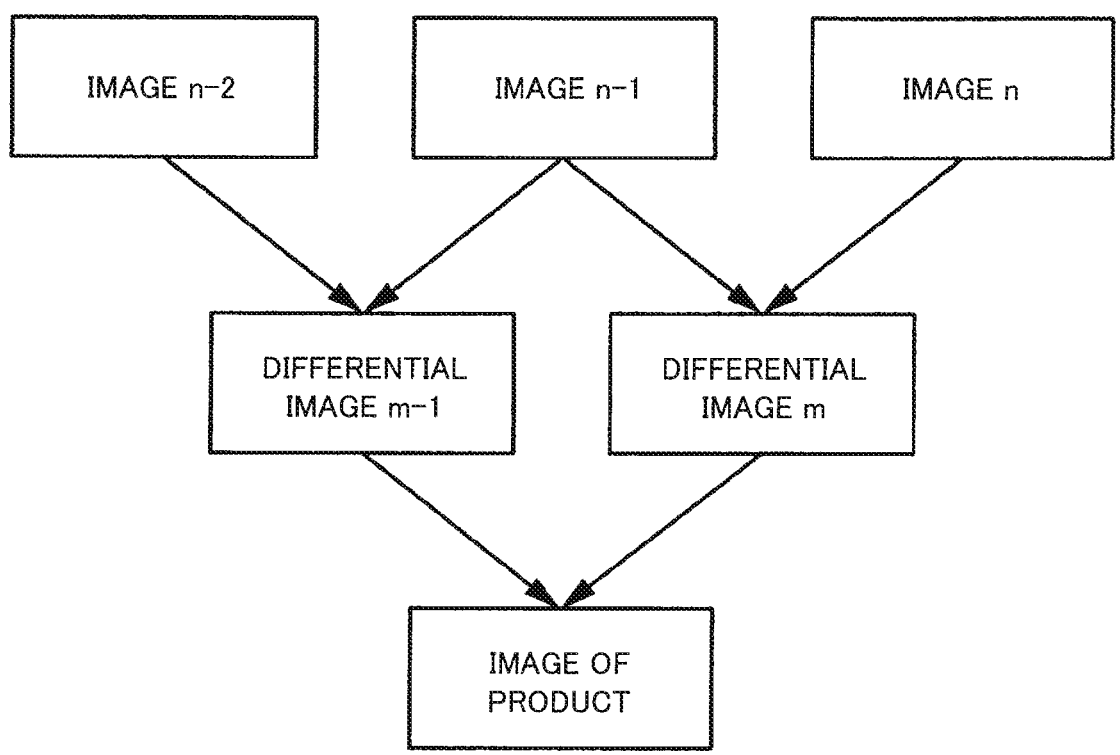
FIG. 3 is an explanatory diagram illustrating relationships between images obtained by a difference extraction unit 114 according to the exemplary embodiment.

FIG. 3 is an explanatory diagram illustrating relationships between images obtained by the difference extraction unit 114. In FIG. 3, the image n represents the current captured image obtained by the captured image acquisition unit 111. The image n-1 represents the captured image immediately before the current captured image. The image n-2 represents the second captured image previous to the current captured image.

The difference extraction unit 114 extracts a difference between the current captured image (image n) and the immediately previous captured image (image n-1) to obtain a differential image m. During the last difference extraction, the difference extraction unit 114 extracted a difference between the immediately previous captured image (image n-1) and the second captured image (image n-2) previous to the current captured image to obtain a differential image m-1.

Then, the difference extraction unit 114 determines the product of the differential image m and the differential image m-1 (image of the product in FIG. 3).

Specifically, similarly to the processing on captured images, the difference extraction unit 114 corrects differential images by calculating the amount of shift on the differential image m and on the differential image m-1 to remove the shift in differential images caused under the influence of swiveling of the image capturing unit 121. Then, the difference extraction unit 114 compares the corrected differential image m with the corrected differential image m-1 on a pixel-by-pixel basis and selects the smaller pixel value (namely the smaller differential value) as a value of the corresponding pixel in the image of the product. In this way, the smaller differential value of the current and last differential images is selected, which makes it possible to remove a differential portion momentarily appearing and disappearing as noise during extraction of an image of a moving object, such as sunlight reflected from ripples on the surface of water.

The filter processing unit 115 in the bird candidate image extraction unit 113 narrows down moving object candidate images by filtering the noise-removed differential images (images of products) as calculated by the difference extraction unit 114. For example, the filter processing unit 115 removes an isolated point from a differential image.

Figure 4:
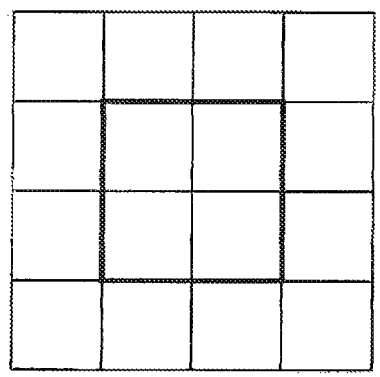
FIG. 4 is an explanatory diagram illustrating an example mask for removing an isolated point used by a filter processing unit 115 according to the exemplary embodiment.

FIG. 4 is an explanatory diagram illustrating an example mask for removing an isolated point used by the filter processing unit 115.

With reference to the mask of 4×4 pixels shown in FIG. 4, if each of the surrounding 12 pixels except 2×2 pixels in the middle has no difference (that is, having a pixel value of 0), the filter processing unit 115 assigns a pixel value of 0 to each of the 16 pixels with the mask applied. In this way, the filter processing unit 115 removes an isolated point as noise where the difference is 2×2 pixels or less in size and its surrounding pixels have no difference.

The filter processing unit 115 removes isolated points by applying the mask to each part of the differential image that has been subjected to the filtering that is based on the size of a difference.

It should be noted, however, that the filtering performed by the filter processing unit 115 is not limited to the filtering based on the size of a difference or removal of isolated points and may include various filtering techniques that narrow down moving object candidate images.

The bird shape determination unit 116 in the bird candidate image extraction unit 113 recognizes a shape on each of the moving object candidate images (each set of partial images in differential images) that have been obtained as a result of narrowing down by the filter processing unit 115 to extract a bird candidate image from the moving object candidate images.

For example, the bird shape determination unit 116 divides the moving object candidate images into bird candidate images and others by machine learning that uses a support vector machine (SVM).

Figure 5:
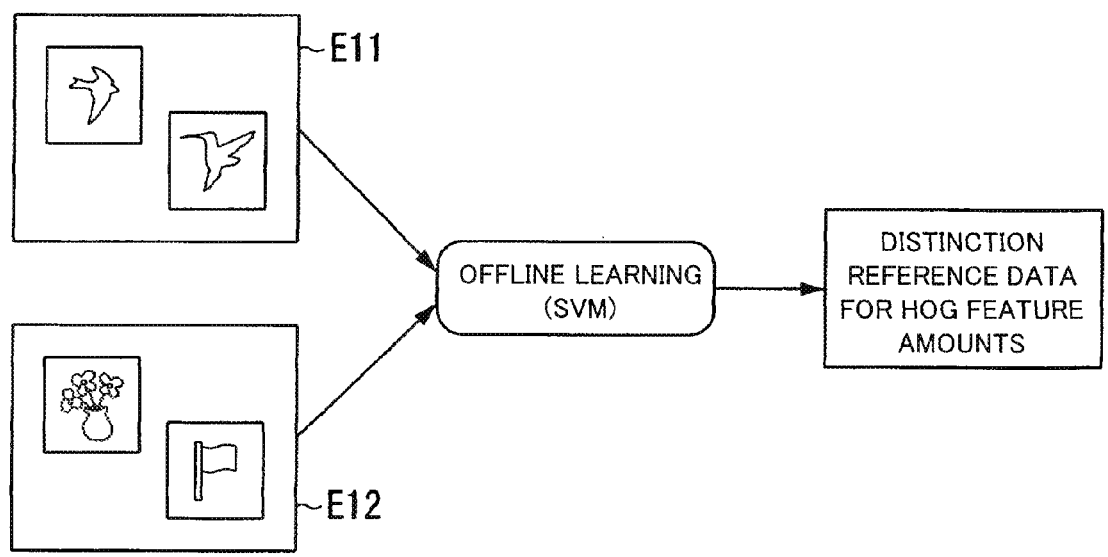
FIG. 5 is an explanatory diagram illustrating learning of distinction reference data performed by a bird shape determination unit 116 according to the exemplary embodiment.

FIG. 5 is an explanatory diagram illustrating learning of distinction reference data performed by the bird shape determination unit 116. The bird shape determination unit 116 calculates the amount of a Histograms of Oriented Gradients (HOG) feature on each of positive samples (correct examples) E11 and negative samples (incorrect examples) E12 of bird images, and carries out off-line learning by SVM of the distinction reference data for HOG feature amounts based on the calculated amounts of HOG features.

Figure 6:
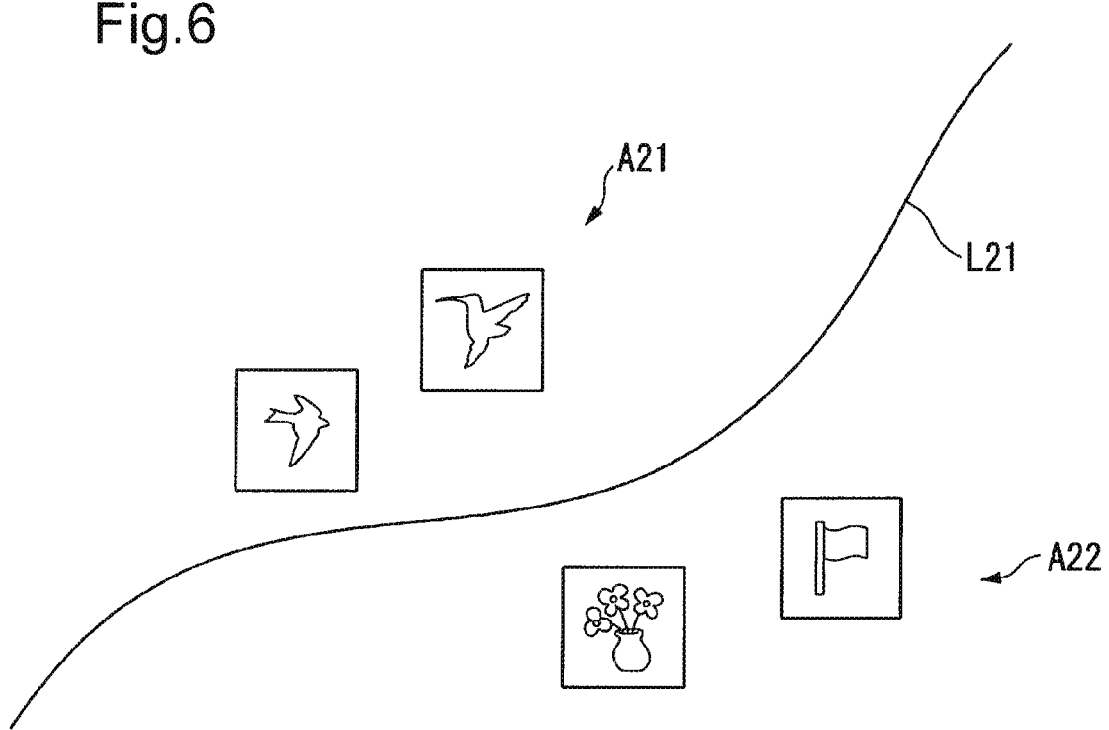
FIG. 6 is an explanatory diagram illustrating distinction reference data obtained by the bird shape determination unit 116 according to the exemplary embodiment.

FIG. 6 is an explanatory diagram illustrating the distinction reference data obtained by the bird shape determination unit 116. In FIG. 6, a line L21, which represents the distinction reference data, divides the space of HOG feature amounts into a positive area A21 and a negative are A22.

Figure 7:
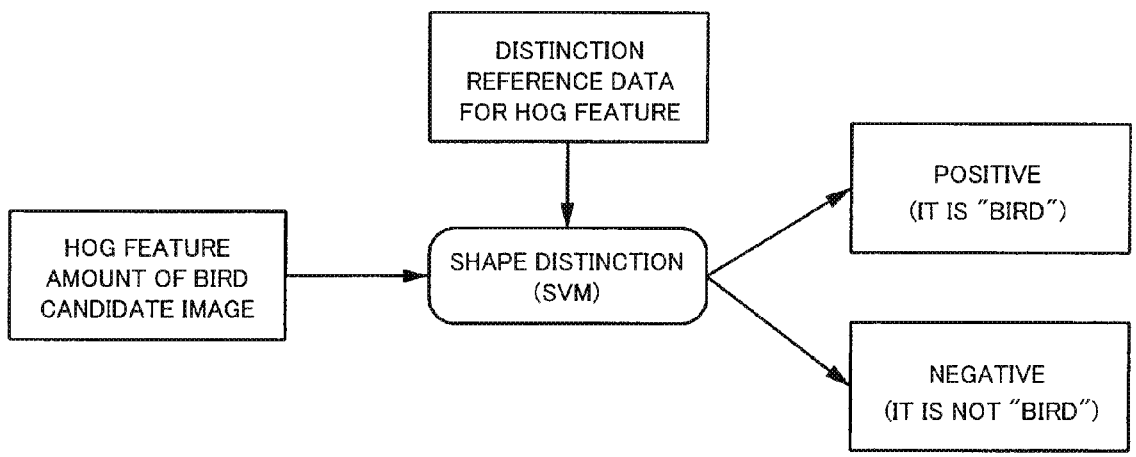
FIG. 7 is an explanatory diagram illustrating narrowing down bird candidate images performed by the bird shape determination unit 116 according to the exemplary embodiment.

FIG. 7 is an explanatory diagram illustrating narrowing down bird candidate images performed by the bird shape determination unit 116. The bird shape determination unit 116 obtains on-line moving object candidate images provided through narrowing down by the filter processing unit 115, calculates their HOG feature amounts, and compares the calculated HOG feature amounts with the distinction reference data to determine whether each image falls within the positive area or the negative area. In this way, the bird shape determination unit 116 extracts a bird candidate image by determining whether a shape represents a bird or not on each of the moving object candidate images that have been obtained as a result of narrowing down by the filter processing unit 115.

It should be noted, however, that extraction of bird candidate images carried out by the bird shape determination unit 116 is not limited to the extraction based on SVM and HOG feature amounts. Various pattern matching techniques for bird shapes may be used as techniques for the bird shape determination unit 116 to extract a bird candidate image.

The bird detection determination unit 117 determines whether a bird has been detected based on the bird candidate images extracted by the bird shape determination unit 116.

Specifically, the bird detection determination unit 117 determines whether a bird has been detected based on the time required for a bird candidate image to move in accordance with the size of the candidate bird image in a captured image. Moreover, the bird detection determination unit 117 determines whether a bird has been detected based on the degree of change in the shape of a bird candidate image per predetermined time.

Figure 8:
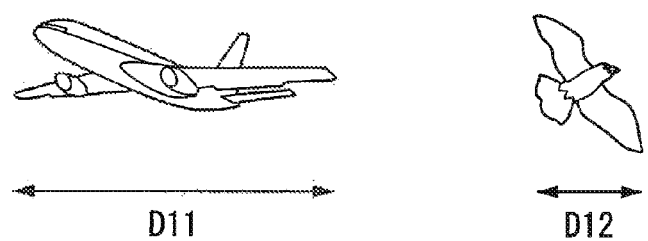
FIG. 8 is an explanatory diagram illustrating example amounts of movement in accordance with the sizes of bird candidate images in captured images according to the exemplary embodiment.

FIG. 8 is an explanatory diagram illustrating example amounts of movement in accordance with the sizes of bird candidate images in captured images. FIG. 8 illustrates the sizes in a horizontal direction of bird candidate images as example amounts of movement in accordance with the sizes of bird candidate images. Specifically, the length D11 represents the size in a horizontal direction of an image of an airplane. The length D12 represents the size in a horizontal direction of an image of a bird. These images have been extracted as bird candidate images.

For example, the bird detection determination unit 117 compares the time required for a bird candidate image to move horizontally along the size in a horizontal direction of the bird candidate image with a predetermined threshold value (500 milliseconds, for example) and determines that a bird has been detected if the time required for moving along the size is equal to or less than the threshold value.

Generally, it is not possible to detect a distance between the subject to be captured (flying object) and the image capturing device 120 from captured images taken by the image capturing device 120. Accordingly, it is impossible to calculate the speed of the subject to be captured.

On the other hand, given that a bird is smaller than an airplane, comparing the ratio of the flight speed of a bird (flight distance per unit time) to the size of the bird with the ratio of the flight speed of an airplane to the size of the airplane leads to the assumption that the ratio of the flight speed of a bird to the size of the bird is higher.

Thus, the bird detection determination unit 117 determines whether the subject to be captured is a bird or airplane, based on the time required for a bird candidate image to move along the amount of movement in accordance with the size of the bird candidate image in a captured image.

Various index values can be used for the determination to be made by the bird detection determination unit 117 based on the time required for a bird candidate image to move along the amount of movement in accordance with the size of the bird candidate image.

For example, the determination may be made based on the time required for a bird candidate image to move along the distance in accordance with the size of the bird candidate image. In this case, the bird detection determination unit 117 detects a time required for a bird candidate image to move along the distance in accordance with the size of the bird candidate image, and determines that a bird has been detected if the obtained time is equal to or less than a predetermined threshold time.

Alternatively, the determination may be made based on what is called a relative speed of a bird candidate image, which is given by dividing the amount of movement of the candidate bird image per unit time by the distance in accordance with the size of the bird candidate image. In this case, the bird detection determination unit 117 calculates the relative speed of a bird candidate image, and determines that a bird has been detected if the obtained relative speed is equal to or greater than a predetermined threshold speed.

During the above-described determination, if the time required for a bird candidate image to move along the amount of movement in accordance with the size of the bird candidate image exceeds an aforementioned threshold value, the bird detection determination unit 117 does not determine that a bird has been detected.

Even when this is true, however, a bird might be flying in a direction of the imaging axis of the image capturing device 120. That is, when the flying object is flying toward or away from the image capturing device 120, the amount of movement of the flying object image in a captured image is relatively small. Thus, failure in detection of a bird image may occur when the determination is made based on the time required for a bird candidate image to move along the amount of movement in accordance with the size of the bird candidate image in a captured image.

For this reason, the bird detection determination unit 117 further determines whether a bird has been detected based on whether an evaluation value of the degree of change in the shape of a bird candidate image per predetermined time is greater than a predetermined threshold value.

More specifically, the bird detection determination unit 117 performs pattern matching where a similarity of shapes is determined between bird candidate images in the current captured image and the previous captured image, and determines that a bird has been detected if the similarity is smaller than a predetermined threshold value.

Figure 9:
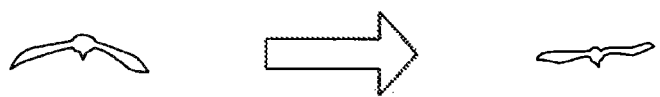
FIG. 9 is an explanatory diagram illustrating example time-series bird images according to the exemplary embodiment.

FIG. 9 is an explanatory diagram illustrating an example of time-series bird images. The diagram shows that the flapping bird has caused a greater temporal change in the shape of the bird images.

Figure 10:
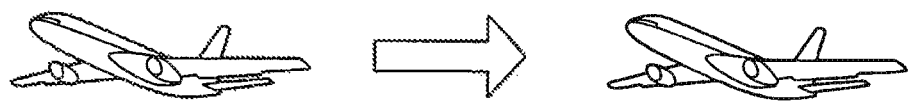
FIG. 10 is an explanatory diagram illustrating example time-series airplane images according to the exemplary embodiment.

FIG. 10 is an explanatory diagram illustrating an example of time-series airplane images. A temporal change in the shape of the airplane images is smaller than that of bird images.

Hence, the bird detection determination unit 117 determines whether a bird has been detected, based on whether an evaluation value of the degree of change in the shape of a bird candidate image per predetermined time is greater than a predetermined threshold value. As a result, even when the bird detection determination unit 117 has failed in detecting a bird during the determination based on the time required for a bird candidate image to move along the amount of movement in accordance with the size of the bird candidate image, it is possible for the bird detection determination unit to detect a bird by using the determination based on the degree of change in the shape of a bird candidate image per predetermined time.

When the bird detection determination unit 117 determines that a bird has been detected, the alarm notification unit 118 outputs an alarm of bird detection, notifying an operator engaged in countermeasures against bird strikes of the detection. The notification allows the operator engaged in countermeasures against bird strikes to recognize appearance of a bird, know where the bird has appeared referring to captured images or the like, take counteractive actions such as repelling birds with a blank shot sound, and take preventive measures such as identifying birds' range of activities to remove their feeding ground.

The alarm notification unit 118 can use various methods for notifying of the detection with an alarm. For example, the alarm notification unit 118 may give notification of the detection by turning on an alarm lamp or by displaying an alarm message on a display screen. Alternatively, the alarm notification unit 118 may give notification of the detection by outputting an alarm sound or a voice message. Furthermore, the alarm notification unit 118 may give notification of the detection by using a combination of these methods.

Operations of the bird detection device 110 will now be described with reference to FIG. 11.

Figure 11:
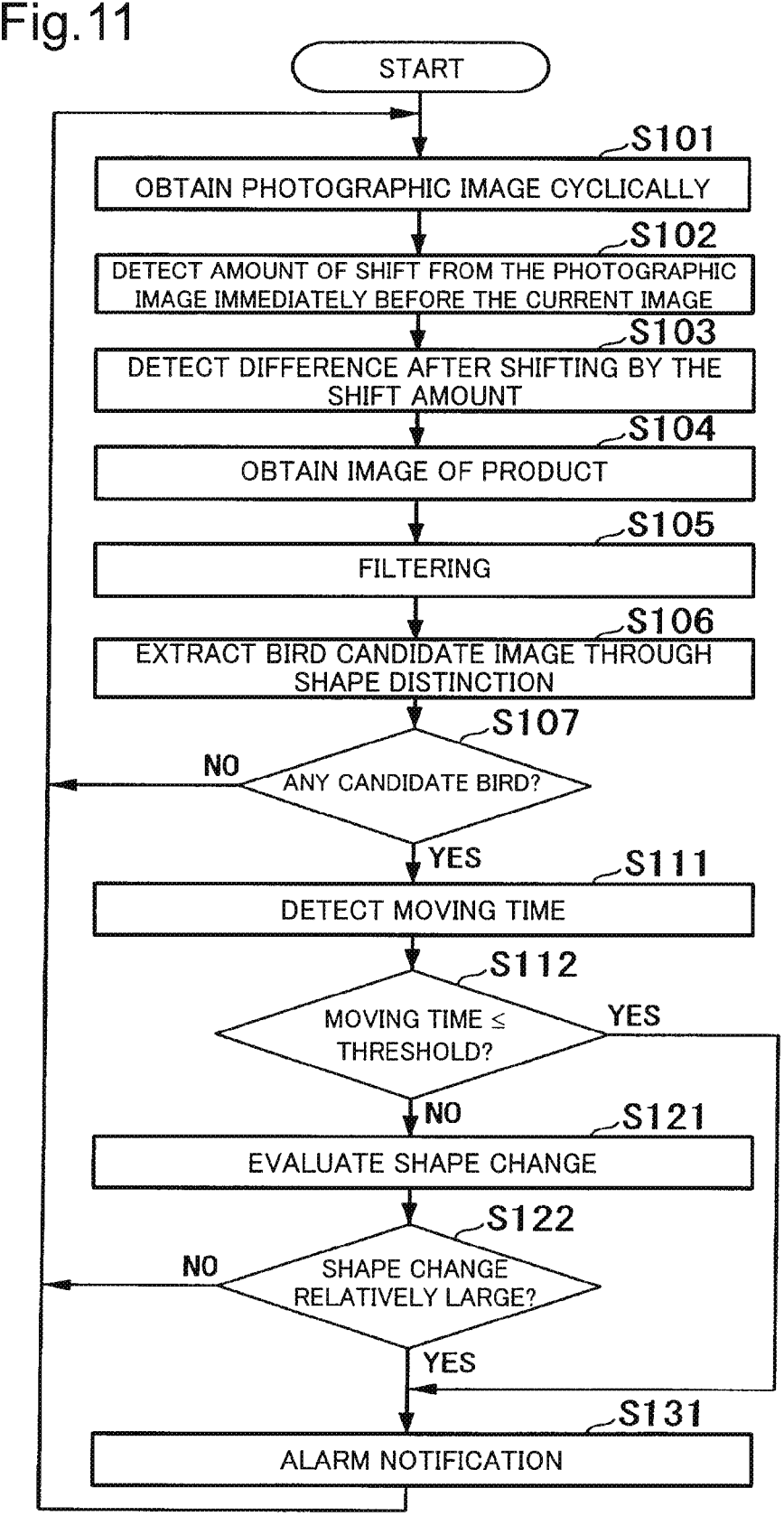
FIG. 11 is an explanatory diagram showing a procedure for detecting a bird carried out by a bird detection device 110 according to the exemplary embodiment.

FIG. 11 is an explanatory diagram showing a procedure for detecting a bird carried out by the bird detection device 110.

In the processing shown in FIG. 11, the captured image acquisition unit 111 starts with obtaining captured images cyclically (Step S101).

Specifically, in the image capturing device 120, the drive control unit 123 controls the drive unit 122 so as to cause the image capturing unit 121 to keep swiveling and to take images at predetermined image capturing intervals. When the image capturing unit 121 takes an image and outputs its image data, the image processing unit 124 carries out image processing such as correcting an image which suffered the rolling shutter phenomenon, and then the captured image transmission unit 125 sends the captured image which underwent image processing in the form of image data. The captured image acquisition unit 111 then obtains the captured image by receiving the image data transmitted from the captured image transmission unit 125.

Next, the difference extraction unit 114 calculates the amount of shift between the current captured image obtained by the captured image acquisition unit 111 and the captured image immediately before the current captured image (Step S102).

The difference extraction unit 114 removes a result of the influence of swiveling of the image capturing unit 121 by correcting the horizontal position of a captured image based on the amount of shift as obtained in Step S102, and then extracts a moving object candidate image from captured images by extracting a difference between the current captured image and the captured image immediately before the current captured image (Step S103).

In addition, the difference extraction unit 114 removes noise by determining the product of the current differential image obtained this time and the differential image obtained last time, as described earlier with reference to FIG. 3 (Step S104).

Next, the filter processing unit 115 narrows down moving object candidate images by carrying out a filtering process on the noise-removed differential image (image of the product) as calculated by the difference extraction unit 114 (Step S105). For example, the filter processing unit 115 removes an isolated point as described earlier with reference to FIG. 4.

Next, the bird shape determination unit 116 extracts a bird candidate image from moving object candidate images by recognizing a shape on each of the moving object candidate images that have been obtained as a result of narrowing down by the filter processing unit 115 (Step S106). For example, the bird shape determination unit 116 extracts a bird candidate image by machine learning that uses a support vector machine (SVM), as described earlier with reference to FIGS. 5 to 7.

The bird detection determination unit 117 then determines whether there is a bird candidate image in the result of extraction performed in Step S106 (Step S107).

If it is determined that there is no bird candidate image (Step S107: NO), the control returns to Step S101.

On the other hand, if it is determined that there exists a bird candidate image (Step S107: YES), the bird detection determination unit 117 detects the time required for a bird candidate image to move in accordance with the size of the bird candidate image in a captured image (Step S111), and determines whether the obtained time is equal to or less than a predetermined threshold time (Step S112).

If it is determined that a bird has been detected in Step S112 (Step S112: YES), the alarm notification unit 118 outputs an alarm notifying that a bird has been detected (Step S131). Then, the control returns to Step S101.

On the other hand, if it is determined that no bird has been detected in Step S112 (Step S112: NO), the bird detection determination unit 117 evaluates the degree of change in the shape of a bird candidate image per predetermined time (Step S121), and determines whether the degree of change in the shape is relatively large or not (Step S122). For example, the bird detection determination unit 117 calculates an evaluation value of the degree of change in the shape of a bird candidate image per predetermined time, and then determines whether the obtained evaluation value is greater than a predetermined threshold value.

If it is determined that the degree of change in the shape is not relatively large (Step S122: NO), the control returns to Step S101.

On the other hand, if it is determined that the degree of change in the shape is relatively large (Step S122: YES), the control goes to Step S131.

As described above, the bird candidate image extraction unit 113 extracts a bird candidate image, which is a candidate for a bird image, from captured images taken by the image capturing device 120. Then, the bird detection determination unit 117 determines whether a bird has been detected, based on the time required for a bird candidate image to move along the amount of movement in accordance with the size of the bird candidate image in a captured image taken by the image capturing device 120.

As a result, the bird detection determination unit 117 can determine whether a bird has been detected by determining whether the bird candidate image is an image of a bird or airplane, without the need for detecting a distance to the flying object, that is to say the subject to be captured. In this respect, the bird detection device 110 can detect a bird more accurately without the need for a mechanism for detecting a distance to the flying object.

Additionally, the bird detection determination unit 117 determines whether a bird has been detected, based on whether an evaluation value of the degree of change in the shape of a bird candidate image per predetermined time is greater than a predetermined threshold value.

As a result, even in the case of failure in detecting a bird during the determination based on the time required for a bird candidate image to move along the amount of movement in accordance with the size of the bird candidate image due to the fact, for example, that the flying object was flying toward or away from the image capturing device 120, it is still possible for the bird detection device 110 (the bird detection determination unit 117) to detect a bird by using the determination based on the degree of change in the shape of a bird candidate image per predetermined time.

A minimum configuration according to the present invention will now be described with reference to FIGS. 12 and 13.

Figure 12:
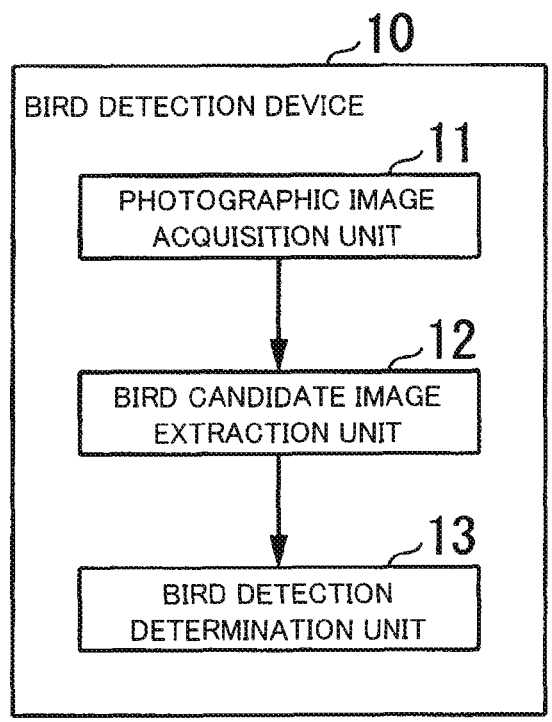
FIG. 12 is a schematic block diagram illustrating a minimum configuration of a bird detection device according to the present invention.

FIG. 12 is a schematic block diagram illustrating a minimum configuration of a bird detection device according to the present invention.

With reference to FIG. 12, a bird detection device 10 includes a captured image acquisition unit 11, a bird candidate image extraction unit 12, and a bird detection determination unit 13.

The captured image acquisition unit 11 obtains captured images. The bird candidate image extraction unit 12 extracts a bird candidate image from captured images obtained by the captured image acquisition unit 11. The bird detection determination unit 13 determines whether a bird has been detected, based on the time required for a bird candidate image extracted by the bird candidate image extraction unit 12 to move along the amount of movement in accordance with the size of the bird candidate image in a captured image obtained by the captured image acquisition unit 11.

In such configuration, similarly to the bird detection device 110 (FIG. 1), the bird detection device 10 can detect a bird more accurately without the need for a mechanism for detecting a distance to a flying object.

Figure 13:
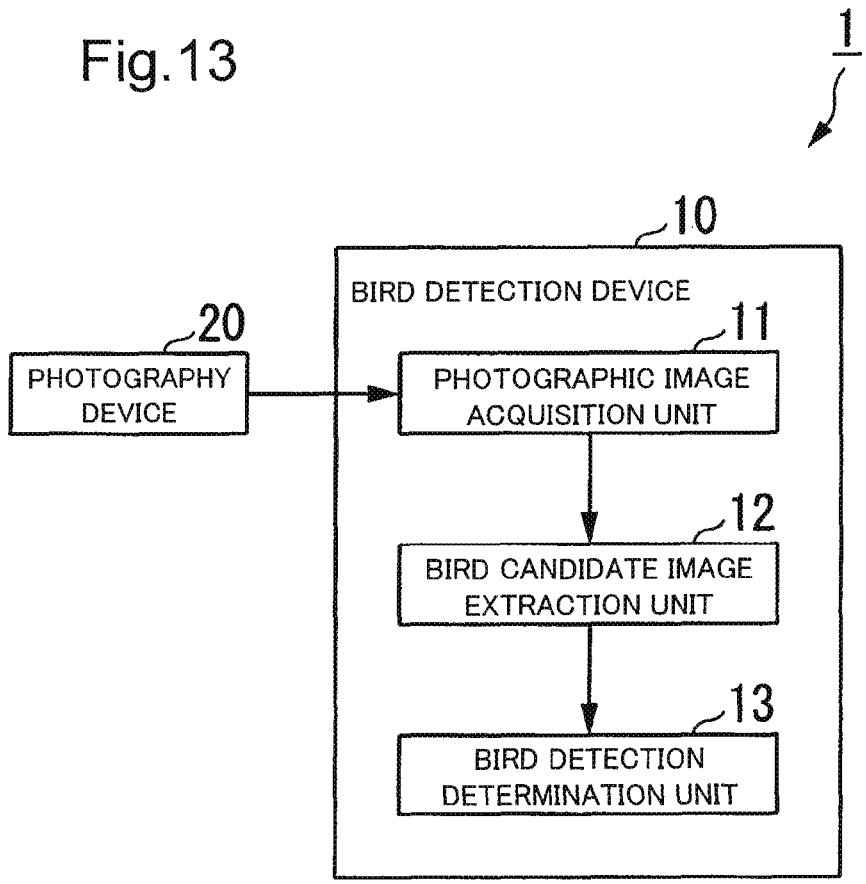
FIG. 13 is a schematic block diagram illustrating a minimum configuration of a bird detection system according to the present invention.

FIG. 13 is a schematic block diagram illustrating a minimum configuration of a bird detection system according to the present invention. With reference to FIG. 13, a bird detection system 1 includes a bird detection device 10 and an image capturing device 20. The bird detection device 10 includes a captured image acquisition unit 11, a bird candidate image extraction unit 12, and a bird detection determination unit 13.

In FIG. 13, identical reference numbers (10, 11, 12, and 13) represent corresponding units in FIG. 12 and their descriptions are omitted here.

The image capturing device 20 takes captured images and outputs the captured images to the bird detection device.

In such configuration, similarly to the configuration in FIG. 12, the bird detection device 10 can detect a bird more accurately without the need for a mechanism for detecting a distance to a flying object.

A program for implementing all or part of the functions of the bird detection system 1 or 100 may be recorded into a computer-readable recording medium, and then the program recorded in the recording medium may be loaded into, and executed on, a computer system to carry out the processes handled by the individual units. The term "computer system" as used herein includes an OS and hardware such as peripheral devices.

The term "computer system" also includes an environment for providing (or for displaying) home pages if a WWW system is used.

The term "computer-readable recording medium" includes a portable medium such as a flexible disk, magneto-optical disk, ROM, and CD-ROM and a storage device such as a hard disk built into the computer system.

The term "computer-readable recording medium" further includes a medium which dynamically retains a program for a short time, such as a communication line which transmits a program via a network like the Internet or via a communication line like a telephone line and, in this case, the term also includes a medium which retains a program for a certain time, such as volatile memory located inside a computer system which acts as a server or a client.

The above-mentioned program may be a program implementing part of the above-described functions, or may be a program implementing the above-described functions in combination with another program that is already recorded in the computer system.

While an exemplary embodiment of the present invention has been described in detail with reference to the drawings, specific configurations are not limited to the exemplary embodiment and include design changes and the like that do not depart from the gist of the present invention.

This application claims priority based on Japanese Patent Application No. 2013-068915 filed on Mar. 28, 2013, the entire disclosure of which is herein incorporated.

INDUSTRIAL APPLICABILITY

According to the present invention, birds can be detected more accurately without the need for a mechanism for detecting a distance to a flying object.

[Reference signs List]

| | |
|---|---|
| 1, 100 | Bird detection system |
| 10, 110 | Bird detection device |
| 11, 111 | Captured image acquisition unit |
| 112 | Image storage unit |
| 12, 113 | Bird candidate image extraction unit |
| 114 | Difference extraction unit |
| 115 | Filter processing unit |
| 116 | Bird shape determination unit |
| 13, 117 | Bird detection determination unit |
| 118 | Alarm notification unit |
| 20, 120 | Image capturing device |
| 121 | Image capturing unit |
| 122 | Drive unit |
| 123 | Drive control unit |
| 124 | Image processing unit |
| 125 | Captured image transmission unit |

The invention claimed is:

1. A bird detection device in combination with a photographic device, the combination comprising:
   a captured image input operatively connected to the photographic device and that receives a captured image from the photographic device,
   wherein the photographic device comprises an image capturing unit and a drive unit, the drive unit connected to the image capturing unit to drive the image capturing unit to swivel at a constant speed over an image capturing area covered by the image capturing unit;
   a bird candidate image extraction unit configured to extract a bird candidate image from the captured image, the bird candidate image being a candidate for a bird image, the bird candidate image extraction unit including a difference extraction unit operatively connected to the captured image input, the difference extraction unit i) detecting a movement of an object in captured images received at the captured image input by calculating an amount of shift in an image caused by the swiveling of the image capturing unit, ii) correcting the captured images by the calculated amount of shift, and iii) extracting a difference between the corrected images; and
   a bird detection determination unit operatively connected to the bird candidate image extraction unit to receive the bird candidate image, and from the bird candidate image determine whether a bird has been detected, based on a time required for the bird candidate image to move in accordance with a size of the bird candidate image in the captured image,
   wherein the bird detection determination unit determines whether a bird has been detected, based on a degree of change in a shape of the bird candidate image per predetermined time.

2. The bird detection device according to claim 1, further comprising:
   an alarm notification unit configured to output an alarm notifying that a bird has been detected,
   wherein the alarm notification unit configured to output the alarm when the bird detection determination unit detects a bird.

3. The bird detection device according to claim 1, wherein the difference extraction unit is configured to extract a difference between a first captured image and a second captured image that was earlier obtained to obtain a first differential image, as well as extracting a difference between the second captured image and a third image that had been earlier obtained to obtain a second differential image, and to obtain an image of a product of the first differential image and the second differential image; and
   a bird shape determination unit configured to extract the bird candidate image based on the image of the product obtained by the difference extraction unit.

4. A bird detection system comprising:
   an image capturing device configured to take a captured image;
   a drive unit connected to the image capturing unit to drive the image capturing unit to swivel at a constant speed over an image capturing area covered by the image capturing unit; and
   a bird detection device,
   wherein the bird detection device comprises:
   a captured image input operatively connected to a photographic device and that receives a captured image from the photographic device;
   a bird candidate image extraction unit configured to extract a bird candidate image from the captured image, the bird candidate image being a candidate for a bird image, the bird candidate image extraction unit including a difference extraction unit operatively connected to the captured image input, the difference extraction unit i) detecting a movement of an object in captured images received at the captured image input by calculating an amount of shift in an image caused by the swiveling of the image capturing unit, ii) correcting the captured images by the calculated amount of shift, and iii) extracting a difference between the corrected images; and
   a bird detection determination unit operatively connected to the bird candidate image extraction unit to receive the bird candidate image, and from the bird candidate image determine whether a bird has been detected, based on a time required for the bird candidate image to move in accordance with a size of the bird candidate image in the captured image,
   wherein the bird detection determination unit determines whether a bird has been detected, based on a degree of change in a shape of the bird candidate image per predetermined time.

5. A non-transitory computer readable medium storing a program for causing a computer as a bird detection device to perform a bird detection method, the method comprising:
   obtaining a captured image using i) an image capturing unit configured to take the captured image, and ii) a drive unit connected to the image capturing unit to drive the image capturing unit to swivel at a constant speed over an image capturing area covered by the image capturing unit;

extracting a bird candidate image from the captured image, the bird candidate image being a candidate for a bird image; and determining whether a bird has been detected, based on a time required for the bird candidate image to move in accordance with a size of the bird candidate image in the captured image, wherein the determination of whether the bird has been detected is based on a degree of change in a shape of the bird candidate image per predetermined time, and wherein the determination of whether the bird has been detected is further based on a difference extraction analysis of plural of the captured image, including i) detecting a movement of an object in captured images by calculating an amount of shift in an image caused by the swiveling of the image capturing unit, ii) correcting the captured images by the calculated amount of shift, and iii) extracting a difference between the corrected images.

6. A bird detection system comprising:

a photographic device comprising an image capturing unit and a drive unit, the drive unit connected to the image capturing unit to drive the image capturing unit to swivel at a constant speed over an image capturing area covered by the image capturing unit;

a radar configured to detect a bird in a high-altitude area, the high-altitude area defined by an area higher than a low-altitude area that is prone to radar cluttering; and a bird detection device configured to detect a bird in the low-altitude area, wherein the bird detection device comprises:

a captured image input operatively connected to the photographic device and that receives a captured image from the photographic device;

a bird candidate image extraction unit configured to extract a bird candidate image from the captured image, the bird candidate image being a candidate for a bird image, the bird candidate image extraction unit including a difference extraction unit operatively connected to the captured image input, the difference extraction unit i) detecting a movement of an object in captured images received at the captured image input by calculating an amount of shift in an image caused by the swiveling of the image capturing unit, ii) correcting the captured images by the calculated amount of shift, and iii) extracting a difference between the corrected images; and a bird detection determination unit operatively connected to the bird candidate image extraction unit to receive the bird candidate image, and from the bird candidate image determine whether the bird candidate image is an image of a bird based on a time required for the bird candidate image to move in a distance in accordance with a size of the bird candidate image, wherein the bird detection determination unit determines whether a bird has been detected, based on a degree of change in a shape of the bird candidate image per predetermined time.

7. The bird detection device according to claim 2, wherein the difference extraction unit is configured to extract a difference between a first captured image and a second captured image that was earlier obtained to obtain a first differential image, as well as extracting a difference between the second captured image and a third image that had been earlier obtained to obtain a second differential image, and to obtain an image of a product of the first differential image and the second differential image; and a bird shape determination unit configured to extract the bird candidate image based on the image of the product obtained by the difference extraction unit.

* * * * *